US006539777B1

(12) United States Patent
Ashworth et al.

(10) Patent No.: US 6,539,777 B1
(45) Date of Patent: Apr. 1, 2003

(54) MEASURING LEAKAGE THROUGH DUCTS

(75) Inventors: Roger Philip Ashworth, Loughborough (GB); Stephen Antony Rowe, Evington (GB)

(73) Assignee: Lattice Intellectual Property Limited, London (GB)

( * ) Notice: Subject to any disclaimer, the term of this patent is extended or adjusted under 35 U.S.C. 154(b) by 0 days.

(21) Appl. No.: 09/807,420

(22) PCT Filed: Oct. 15, 1999

(86) PCT No.: PCT/GB99/03421

§ 371 (c)(1),
(2), (4) Date: Apr. 20, 2001

(87) PCT Pub. No.: WO00/25105

PCT Pub. Date: May 4, 2000

(30) Foreign Application Priority Data

Oct. 22, 1998 (GB) ............................................. 9823041

(51) Int. Cl.[7] ............................................... G01M 3/08
(52) U.S. Cl. ..................................... 73/49.1; 73/40.5 R
(58) Field of Search ........................... 73/40.5 R, 49.5, 73/49.1

(56) References Cited

U.S. PATENT DOCUMENTS

| 3,817,086 | A |   | 6/1974  | Dorgebray |          |
|-----------|---|---|---------|-----------|----------|
| 3,974,680 | A | * | 8/1976  | Beaver    | 73/40.5 R |
| 4,000,655 | A | * | 1/1977  | Jones     | 73/432 R |
| 4,402,213 | A |   | 9/1983  | Hogan     | 73/40.5 R |
| 4,872,336 | A | * | 10/1989 | Baillie   | 73/40.5 R |
| 5,072,621 | A |   | 12/1991 | Hasselmann | 73/40.5 R |
| 5,343,737 | A | * | 9/1994  | Baumoel   | 73/40.5 R |
| 5,966,789 | A | * | 10/1999 | Dickson et al. | 29/235 |
| 6,318,194 | B1 | * | 11/2000 | Marvin et al. | 73/865.5 |
| 6,339,953 | B1 | * | 1/2002  | Ashworth  | 73/49.5 |
| 6,348,869 | B1 | * | 2/2002  | Ashworth  | 340/605 |

FOREIGN PATENT DOCUMENTS

| GB | 1207090    | 9/1970  |
| GB | 1376236    | 12/1974 |
| GB | 1547301    | 6/1979  |
| GB | 2138955 A  | 10/1984 |
| GB | 2329254 A  | 3/1999  |

OTHER PUBLICATIONS

U.S. patent application Ser. No. 09/486,730, filed Mar. 28, 2000, pending.
U.S. patent application Ser. No. 09/807,420, filed Apr. 20, 2001, pending.

* cited by examiner

Primary Examiner—Daniel S. Larkin
Assistant Examiner—Charles Garber
(74) Attorney, Agent, or Firm—Oblon, Spivak, McClelland, Maier & Neustadt, P.C.

(57) ABSTRACT

A pipe leakage detection system which includes a flexible probe with a body portion of sufficient length to pass along a pipe. Pairs of seals define a seal volume with the inner pipe wall. An adjacent test region can be used to determine leakage. A source of fluid pressure is applied to lines. With equal pressure in both seal and test regions as indicated by a manometer no leak will occur around the seals. A deliberate outgoing flow rate is allowed from a line and any differential in flow, as detected by flow meters, will indicate an actual leakage rate.

11 Claims, 4 Drawing Sheets

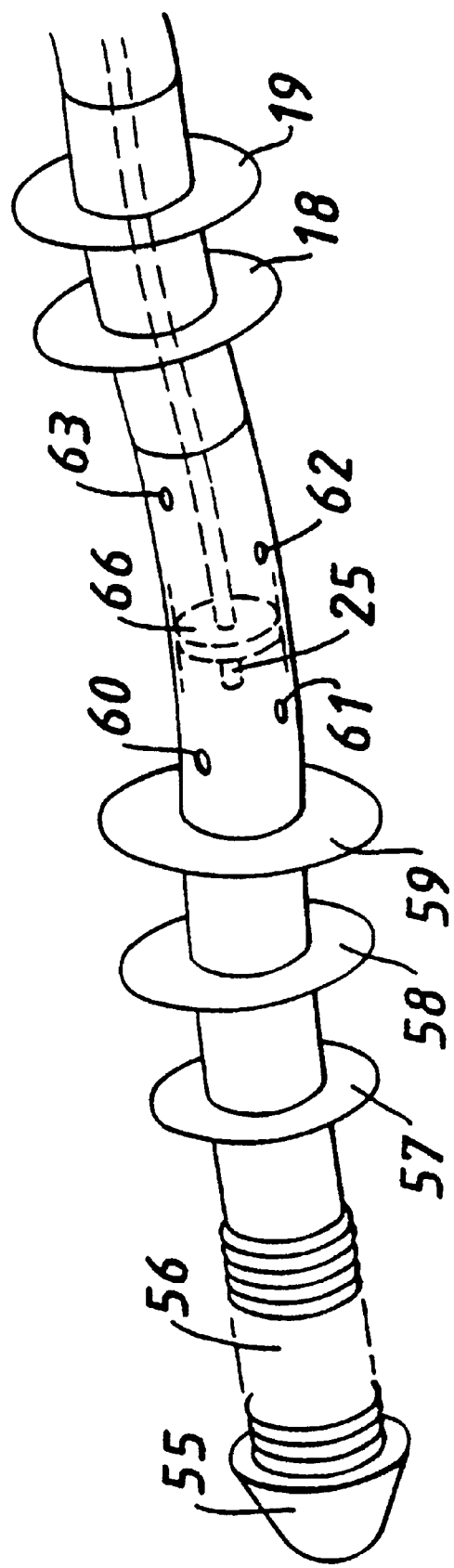

MEASURING LEAKAGE THROUGH DUCTS

BACKGROUND OF THE INVENTION

1. Field of the Invention

The invention relates to measuring leakage through ducts, typically pipes for carrying fluids, and more particularly to measuring leakage with less disruption.

2. Discussion of the Background

In fluid carrying pipes such as gas pipes, for example, it has been necessary to isolate the section of pipe carrying the gas to be tested and to carry out excavation. This is time consuming and costly. With service pipes it has been necessary to excavate pipes on the customer's premises to gain access for checking pipe integrity.

SUMMARY OF THE INVENTION

The present invention is concerned with providing a less disruptive and less expensive mechanism to allow leakage testing of pipes to be effected.

According to the invention there is provided a leak testing system for pipes including: means for providing a temporary seal at a first location in a pipe; means for providing and maintaining a substantially equal pressure between the first location and an adjacent test location in the pipe to prevent fluid passage therebetween; and means for determining any fluid flow from the test location indicative of pipe leakage.

Further according to the invention there is provided a leak testing probe for pipes, said probe including: an elongate flexible body portion for travelling along the bore of a pipe; and first and second spaced seals mounted on the body for effecting a seal with the inner wall of the pipe, in use, to provide a first sealed region between the seals and an adjacent test region therewith.

Still further according to the invention there is provided a method for testing leaks in pipes including the steps of: providing a temporary seal at a first location in a pipe; providing and maintaining a substantially equal pressure between the first location and an adjacent test location in the pipe to prevent fluid passage therebetween; and determining any fluid flow from the test location indicative of pipe leakage.

BRIEF DESCRIPTION OF THE DRAWINGS

The invention will now be described by way of example with reference to the accompanying drawings in which:

FIG. 4 shows an alternative probe arrangement.

DESCRIPTION OF THE PREFERRED EMBODIMENTS

Figure 1:
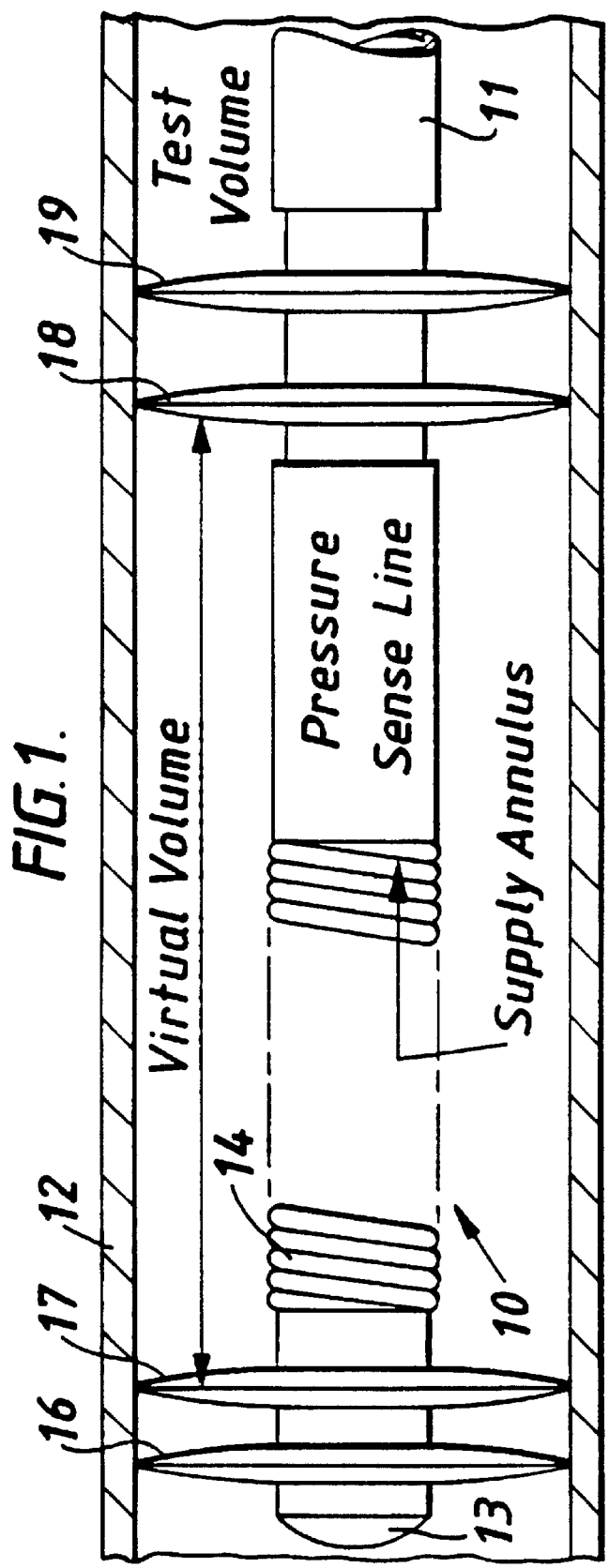
FIG. 1 shows an embodiment of the tester sealing probe within the pipeline.

The seal arrangement 10 of FIG. 1 is configured to provide a mechanism for testing a service pipe under live conditions. The device includes an elongate flexible body portion 11 of sufficient length to pass through the pipe 12. The probe head 13 (e.g. rubber) has a curved end portion to facilitate passage through the pipe. An intermediate body portion 14 comprises a resilient (e.g. coil spring) tube again to assist in smooth passage through the pipe. A pair of disc-like seals 16, 17 extend from the body to contact the inner wall of pipe 12. A further pair of disc-like seals 18, 19 spaced from the first pair also contact the inner wall of pipe 12. Thus the area around the intermediate portion 14 between the seals 17 and 18 defines a virtual seal chamber volume. Along the body portion from the seal 19 to the entry point of the pipe will provide the test chamber volume.

The probe carries two lines which are coaxial, the inner line being used as the sensing line and the outer line as the fluid provider.

In order to allow access of the test device into a service pipe carrying gas, the meter control valve is closed, the meter removed and a live insertion adapter is connected in its place. The adapter will contain the front portion of the leak testing mechanism in sealed relationship. The other end of the device is connected to tubes and measuring equipment described in detail below.

On opening the meter valve, the assembly can pass through the valve body aperture into the service pipe and is deployed until the head 13 of the device is beyond the boundary of the customer's property.

Figure 2:
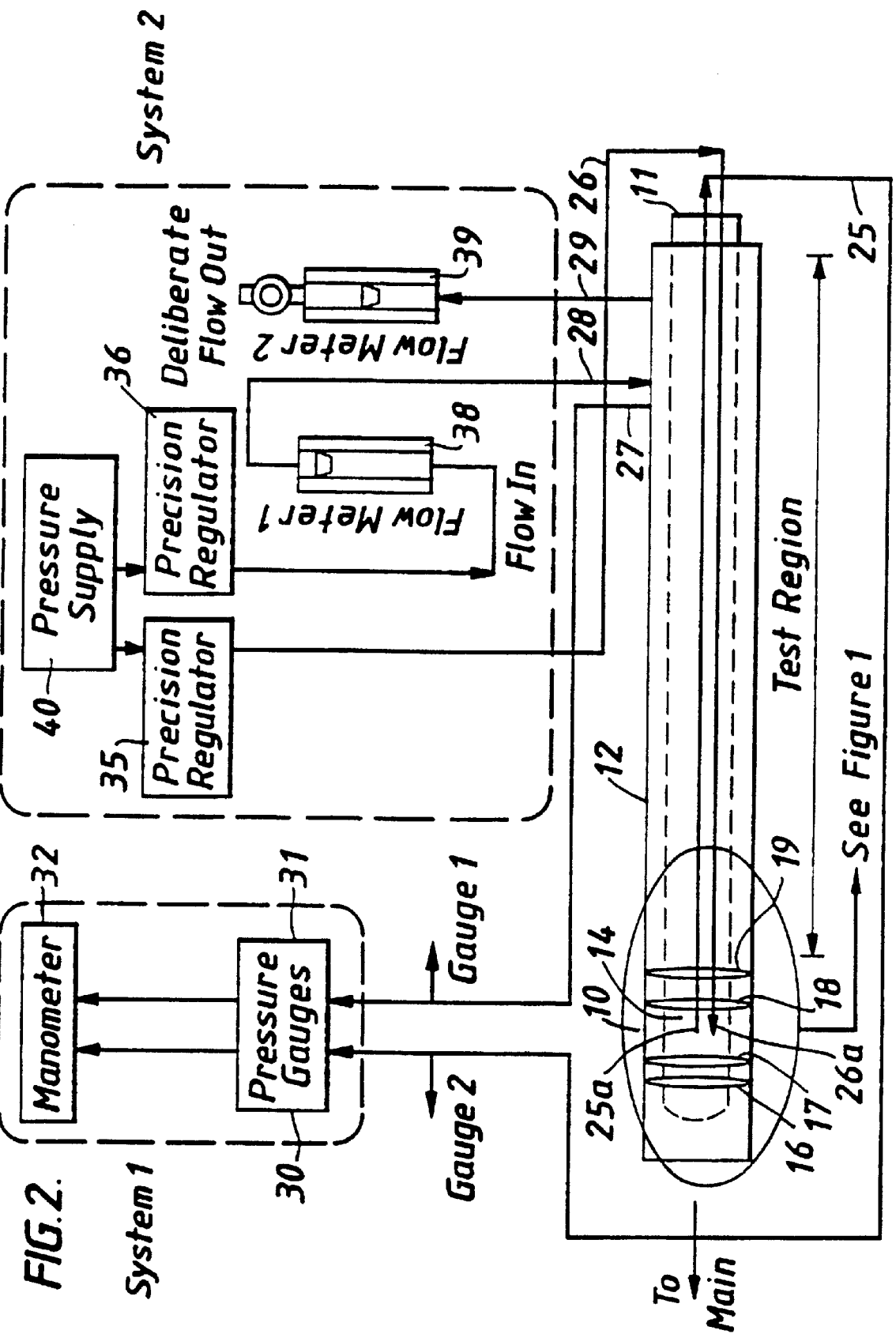
FIG. 2 shows the measurement configuration associated with the probe.

The probe is part of the control and testing arrangement required to detect a leak, as now illustrated in FIG. 2.

The sealing probe 10 does not require a perfect seal with the pipe wall to operate as the arrangement is designed to work as a 'virtual' seal. It achieves this by balancing the pressure within the test volume with that of the virtual volume in intermediate region 14. This eliminates any flow over the seals between the two volumes. However, flow will occur from the virtual volume to the mains side of the service pipe if the test is conducted above line pressure. In order to determine a leak in the service pipe a deliberate outgoing flow is introduced as now described.

A plurality of umbilicals terminating in fluid lines 25–29 are connected to the pipe end or the probe 10 at the end 11 via the service adapter (not shown but described in more detail below with reference to FIG. 3).

For the sake of ease of understanding, the lines 27, 28 and 29 are shown entering the wall of the pipe 12 but of course in practice enter the end of the pipe via the service adapter in sealed manner to avoid fluid escape.

Similarly the lines 25 and 26 will be in sealed relationship with the end 11 of the probe to avoid fluid escape. The line 25 is configured to terminate at point 25a within the virtual seal volume at one end and connected to a pressure gauge 30.

Line 27 terminating in the test region of the pipe is connected to a second pressure gauge 31. These are linked to a manometer 32.

Line 26 also terminating within the virtual seal volume at 26a is connected to a source of regulated pressure at regulator 35. To supply regulated pressure to the test region, line 28 receives fluid from regulator 36 via flow meter 38. A second flow meter 39 allows a deliberate fluid flow to pass from the test region via line 29.

A pressure supply 40 supplies the fluid for regulation (i.e. pressurised gas).

The system operates by supplying the virtual volume with fluid flow via line 26 and sensing the pressure in the virtual seal area via line 25 and gauge 30. Fluid flow from line 28 is introduced into the test region of the pipe via flowmeter 38 and pressure in this region is detected via line 27 and gauge 31. With equal pressure in both the virtual seal and test regions (as indicated by manometer 32) no leak will occur around or over the seals 17 and 18.

To determine any leakage within the service pipe wall, joints and so on which requires repair, a deliberate leak is introduced via the flow meter 39 which is connected to the test volume. This serves to drive the test volume regulator to ensure that the regulator is constantly being loaded to avoid any hunting effect with the flow meters.

Before any reading can be taken the manometer 32 must always read zero. If the manometer does not read zero then flow could occur over the seal and thus an incorrect reading could possibly be made.

The arrangement will monitor gross gas flow within the service pipe whilst balancing the pressure over the seal. The equipment utilises the flow continuity equation, $Flow_{in} = Flow_{out}$. This is achieved in practical terms by measuring any differential flow with flow meters.

To determine how the leakage operation operates in more detail, the pressure in the service pipe using gauge 31 is observed and the flow in meter 38 adjusted to a preselected flow rate. Balancing the pressure by adjusting regulator 35 will ensure the manometer 32 reads zero. The introduced leak via flow meter 39 will require some adjustment of the flow pressure to balance the manometer.

To determine the actual leak in the service pipe the difference in the flow readings on meter 38 and 39 will give the flow lost due to actual leakage.

We have determined that even small leaks in the region of as low as 0.05 L/Min can be determined. The test duration can take just a few minutes so this short measurement operation is very cost effective and avoids major disruption.

Figure 3:
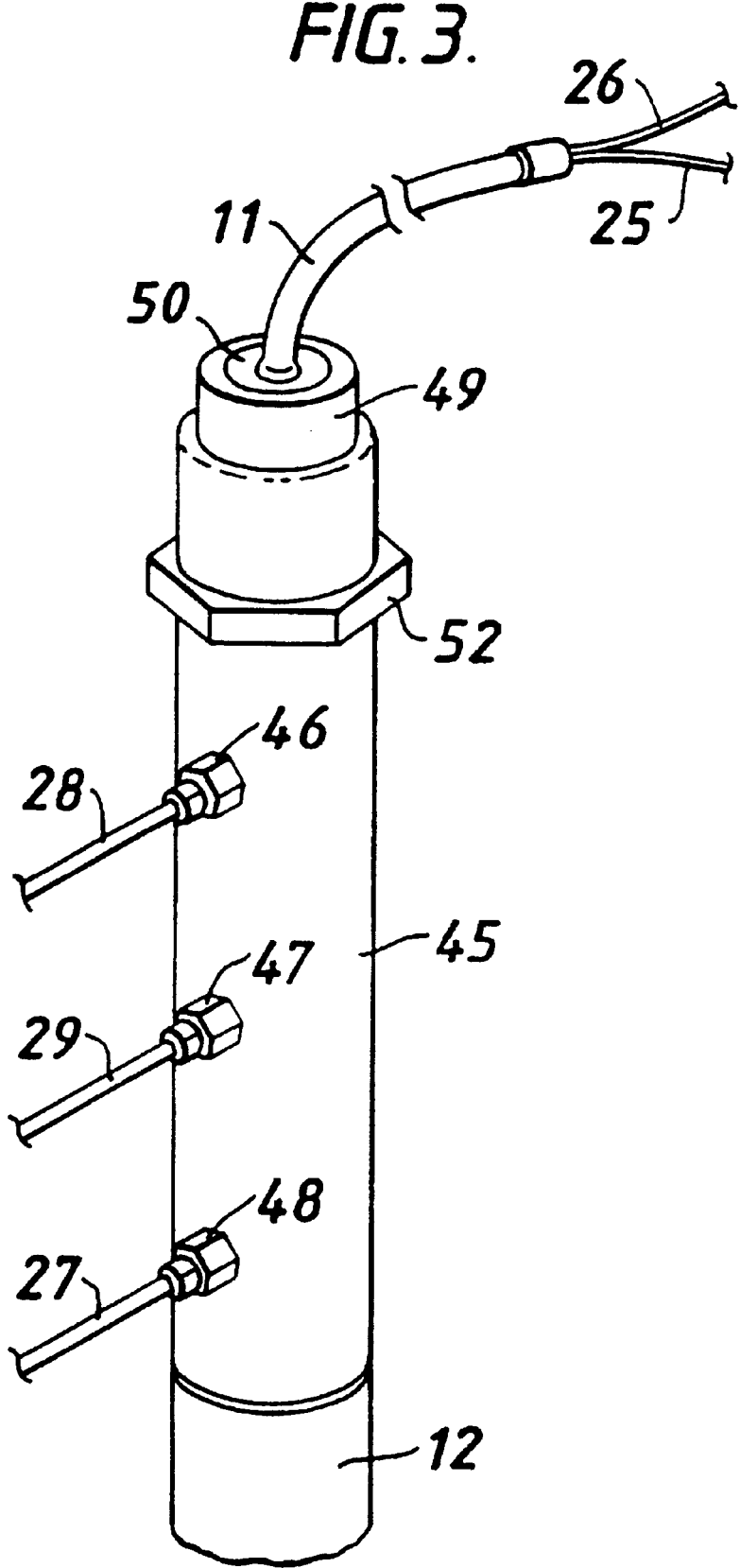
FIG. 3 shows an embodiment of the service pipe adapter for receiving the probe and other fluid lines.

The service pipe adapter as shown in FIG. 3 includes a tubular body portion 45 (e.g. of brass) with fittings 46–48 for attaching the supply line 28, the outgoing flow line 29 and the pressure sensing line respectively to allow these to be available to the service pipe. The hexagonal nut 52 allows the adapter to be tightened onto the service pipe.

The tube 11 associated with the probe which carries the supply line 26 and the pressure sensing line 25 is inserted in sealed relationship with the adapter by means of the rubber seal 50 co-operating with the closure 49.

Hence the necessary sensing and fluid provision lines are accommodated via the adapter to provide a rapid entry point for leak determination.

The probe head arrangement of FIG. 1 can be modified to that shown in FIG. 4. In this case the probe head is modified to include rubber end piece 55 connected to a coiled spring portion 56 for guidance prior to the seals. In the modified embodiment, three seals 57–59 are utilised each with a slightly increased diameter to assist in guiding and sealing under various pipe conditions.

Two seals 18, 19 on the other side of the seal volume are provided as before. The tube in the region of the seal volume has a number of apertures (apertures 60–63 being visible in this view). A separator seal 66 retains the pressure sense line 25 as. well as isolating the supply annulus from the end of the sense line so that the sense line is capable of sensing the pressure in the virtual seal area without influence from the incoming fluid pressure source. Hence the miniaturised construction of the flexible seal probe allows it be negotiate the meter control valve, pipe bends, and other partial obstructions on its path into the service pipe, which pipe may have an internal bore of only about 30 cm.

What is claimed is:

1. A leak testing system for a pipe, the leak testing system comprising:
   means for providing a temporary seal at a first location in the pipe;
   means for providing and maintaining a substantially equal pressure between the first location and an adjacent test location in the pipe to prevent fluid passage therebetween; and
   means for determining any fluid flow from the adjacent test location indicative of pipe leakage,
   wherein the means for providing the temporary seal includes a flexible probe with first and second seal means attached thereto;
   wherein the flexible probe includes a first fluid path for applying a source of fluid between the first and second seal means and a second fluid path for allowing a fluid pressure between the first and second seal means to be determined, in use.

2. The system as claimed in claim 1, wherein the means for determining fluid flow includes means for providing a deliberate flow of fluid from the test region, first flow sensor means for measuring the flow and second flow sensing means for measuring overall flow to allow the differential to indicated actual leakage rate.

3. The system as claimed in claim 1, wherein the first and second seal means each comprise a pair of spaced resilient seals to provide a seal volume therebetween.

4. The system as claimed in claim 1, further including adapter means for connection to the pipe to provide the temporary seal and fluid pressure access to the pipe.

5. A leak testing probe for a pipe, said probe comprising:
   an elongate flexible body portion for traveling along the bore of the pipe;
   first and second spaced seals mounted on the elongate flexible body portion for effecting a seal with an inner wall of the pipe, in use, to provide a first sealed region between the first and second spaced seals and an adjacent test region therewith;
   first fluid passage means for providing a path for fluid flow into the first sealed region spaced by the first and second spaced seals; and
   second fluid passage means for allowing a fluid pressure in the first sealed region to be determined.

6. The probe as claimed in claim 5, wherein separator means are provided to isolate an outlet of the first fluid passage means from an inlet of the second fluid passage means.

7. The probe as claimed in claim 5, further including elongate spring guide means.

8. A method for testing leaks in a pipe, the method comprising the steps of:
   providing a temporary seal at first and second spaced points at a first location in the pipe;
   providing and maintaining a substantially equal pressure between the first location and an adjacent test location in the pipe to prevent fluid passage therebetween;
   determining any fluid flow from the adjacent test location indicative of pipe leakage; and
   providing a first fluid path for applying a source of fluid between the first and second spaced points and providing a second flow path for allowing a fluid pressure between the first and second spaced points to be determined.

9. The method as claimed in claim 8, wherein the fluid flow determining step includes providing a deliberate flow of fluid from the test region, measuring the flow, and measuring an overall flow from the pipe to allow a differential to indicate an actual leakage rate.

10. The method as claimed in claim 8, further including the step of providing the temporary seal at first and second spaced points at the first location.

11. The method as claimed in claim 8, further including the step of providing a pipe adapter to allow for the temporary seal and fluid pressure access.

\* \* \* \* \*